United States Patent [19]
Saffire et al.

[11] Patent Number: 5,340,301
[45] Date of Patent: Aug. 23, 1994

[54] CORRUGATED SUBSTRUCTURE FORMING TOOL

[75] Inventors: Victor N. Saffire, Westlake Village; John H. Masters, Newhall; Robert L. Hartman, Lennox; Robert B. Taaffe, Manhattan Beach, all of Calif.

[73] Assignee: Northrop Grumman Corporation, Los Angeles, Calif.

[21] Appl. No.: 762,653

[22] Filed: Aug. 5, 1988

[51] Int. Cl.⁵ .............................. A21C 3/02; B32B 5/12
[52] U.S. Cl. .................................. 425/336; 269/505; 428/116; 162/296
[58] Field of Search ................ 428/116, 117; 162/296; 264/505, 286; 425/336

[56] References Cited

U.S. PATENT DOCUMENTS

| | | | |
|---|---|---|---|
| 3,170,192 | 2/1965 | Oesterheld | 18/19 |
| 3,540,079 | 11/1970 | Bush | 18/19 |
| 4,053,667 | 10/1977 | Smith | 428/116 X |
| 4,090,340 | 5/1978 | Becker | 428/116 X |
| 4,578,303 | 3/1986 | Kundinger et al. | 428/116 X |

*Primary Examiner*—Peter A. Nelson
*Attorney, Agent, or Firm*—Terry J. Anderson; Robert B. Block; Karl J. Hoch, Jr.

[57] ABSTRACT

A process and apparatus for rapidly and accurately forming corrugated substructures of complex shapes utilizing composite material A plurality of movable elongated ribs are positioned on a base plate for lateral movement between an open position at which all of the ribs are physically separated and a closed position at which each of the ribs is engaged with its adjacent rib or ribs. The ribs are so formed that when they collectively assume the closed position, upper regions of the ribs remain spaced apart to define longitudinally extending channels. A pre-cut sheet of composite prepreg material is laid over the ribs so as to be coextensive with them. The ribs are then moved together mechanically or by means of vacuum drawing the sheet material into the channels or both. With the aid of elongated tooling bars placed on the outer surface of the sheet material and aligned with successive channel s, the sheet material is drawn into conforming relationship with the ribs. A frame fixture is then attached to encompass the outer periphery of the ribs to releasably hold the ribs in their collectively closed positions. So supported, the sheet material can be removed from the base plate, then cured so as to retain the corrugated shape imparted by the ribs acting collectively.

15 Claims, 4 Drawing Sheets

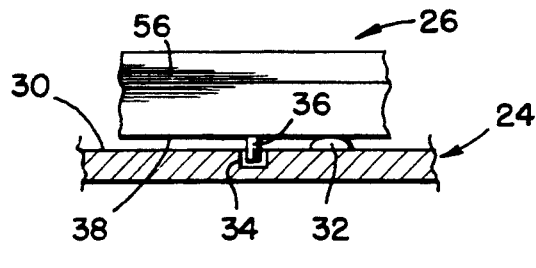
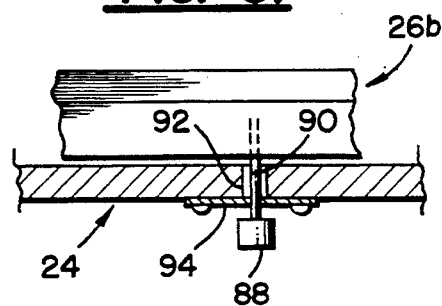
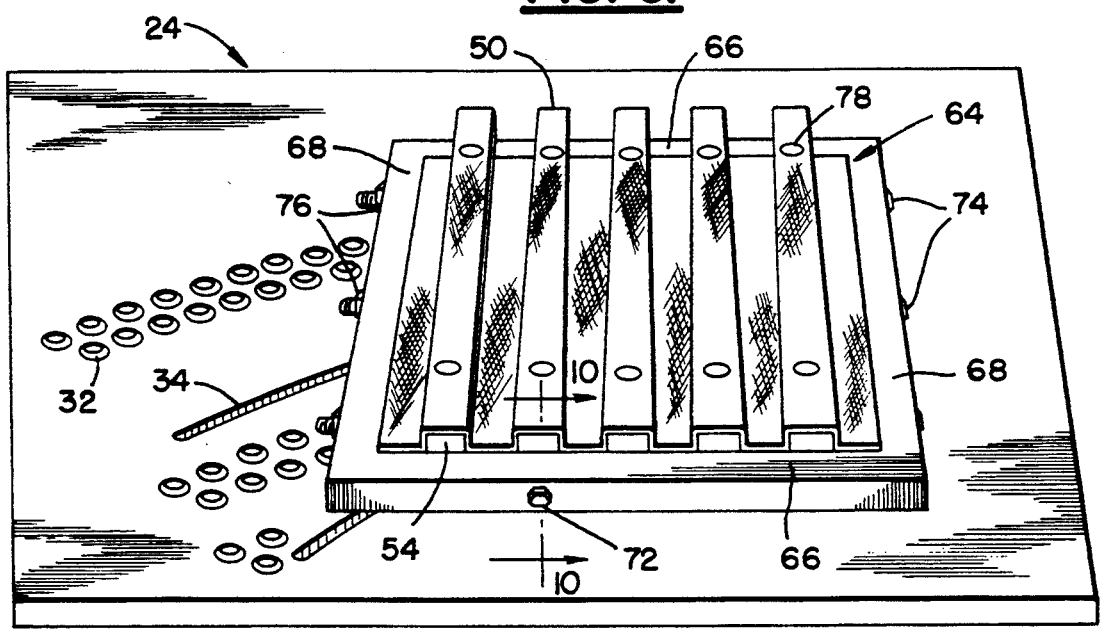
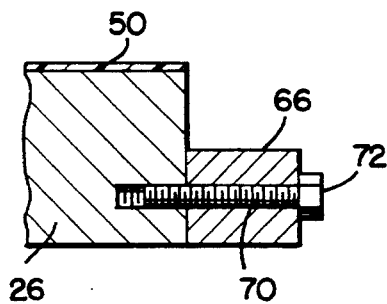

CORRUGATED SUBSTRUCTURE FORMING TOOL

CONTRACTUAL ORIGIN OF THE INVENTION

The United States Government has rights in this invention pursuant to Contract No. F33615-82-C-5012 between the U.S. Air Force and Northrop Corporation.

BACKGROUND OF THE INVENTION

1. Field of the Invention

This invention relates generally to a process and apparatus for forming a corrugated substructure and, more specifically, to such a process and apparatus for rapidly and economically forming a corrugated substructure which is of complicated shape.

2. Description of the Prior Art

For many years, aluminum honeycomb has been utilized as a very strong, yet light weight, substructure for the construction of airfoils and other airfree components of high performance aircraft.

Unfortunately, aluminum honeycomb has been identified as one of the major sources of corrosion problems in older designs. At the same time, the use of aluminum honeycomb in aircraft construction is labor intensive by reason of the substantial amount of machining which is required in order to properly shape the honeycomb to the necessary aircraft contours.

An important recent technological achievement has been the development of corrugated cores of graphite composite material. Such materials have the desirable characteristics of aluminum honeycomb including lightweight and strength, but have the added benefit of not being subject to corrosion. However, as with aluminum honeycomb, until the present time, the fabrication of the graphite corrugated substructure has been limited to hand layup methods which are themselves labor intensive.

Efforts to automate the continuous production of corrugated material have achieved some measure of success as exemplified by the U.S. patents to Oesterheld, No. 3,170,192, issued Feb. 23, 1965 and to Bush, No. 3,540,079, issued Jan. 30, 1968. According to Oesterheld, soft fresh sheets of fibrous cement are passed over corrugations in the cover of a suction box at approximately uniform speed. Suction in the suction box serves to draw the cement downwardly against the corrugations of the cover of the suction box. After the sheet has been thus formed, it is removed to be set and cured such that the corrugations are permanently formed in the sheet material.

The Bush machine operates to corrugate continuous sheets of pliable material such as plastic, paper, metal foil, or certain textiles. As with Oesterheld, a vacuum draws the sheet being corrugated downwardly into firm engagement with a plurality of spaced ribs over which it is drawn. The transverse spacing of the ribs is variable and when the spacing is reduced to a minimum the sheet is drawn to the area between the adjacent ribs to form the corrugations.

However, such known techniques apply to the production of regularly shaped and repeatable corrugated designs. In contrast, the techniques which are disclosed herein are directed toward the fabrication of highly irregular shapes which, by reason of their irregularity, had previously required totally manual handling which, at best, utilized jigs and fixtures applicable only to a portion of the procedure.

SUMMARY OF THE INVENTION

It was with recognition of a need and of the state of the prior art, generally as described above, that the present invention was conceived and has now been reduced to practice. Specifically, the invention relates to a process and apparatus for rapidly and accurately forming corrugated substructures of complex shapes utilizing composite materials. A plurality of movable elongated ribs are positioned on a base plate for lateral movement between an open position at which all of the ribs are physically separated and a closed position at which each of the ribs is engaged with its adjacent rib or ribs. The ribs are so formed that when they collectively assume the closed position, upper regions of the ribs remain spaced apart to define longitudinally extending channels. A pre-cut sheet of composite "prepreg" material is laid over the ribs so as to be coextensive with them. The term "prepreg" as used through this specification is intended to be descriptive of a reinforcing material such as a matrix of woven graphite combined with a full compliment of resin, such as epoxy, prior to molding and curing. The ribs are then moved together mechanically or by means of vacuum drawing the sheet material into the cavities or both. With the aid of elongated tooling bars placed on the outer surface of the sheet material and aligned with successive channels, the sheet material is drawn into conforming relationship with the ribs. A frame fixture is then applied encompassing the outer periphery of the ribs to releasably hold the ribs in their collectively closed positions. So supported, the sheet material can then be removed from the base plate and cured so as to retain the corrugated shape imparted by the ribs collectively.

The process and apparatus disclosed, thus achieves the goals sought by the inventors when they first attempted a new fabrication technique which was appropriate to the new graphite composite material, a material which they knew had qualities superior to the previously used aluminum honeycomb. The resulting structure is corrosion-free and, therefore, substantially maintenance-free. The process itself has, for example, initially reduced the number of recurring hours required by the manual layup method from eight to two and a half without any reduction in the quality of the finished product.

Other and further features, objects, advantages, and benefits of the invention will become apparent from the following description taken in conjunction with the attached drawings. It is to be understood that both the foregoing general description and the following detailed description are exemplary and explanatory but are not restrictive of the invention. The accompanying drawings, which are incorporated in and constitute a part of this invention, illustrate one embodiment of the invention, and together with the description, serve to explain the principles of the invention.

BRIEF DESCRIPTION OF THE DRAWINGS

In the drawings:

FIG. 5A is a cross section view taken generally along line 5A—5A in FIG. 3;

FIG. 8 is a cross section view taken generally along line 8—8 in FIG. 6;

FIG. 9 is a perspective view, similar to FIG. 5, illustrating a frame fixture applied to the rib elements following the step which resulted in the arrangement illustrated in FIG. 5; and FIG. 10 is a cross section view taken generally along line 10—10 in FIG. 9.

DESCRIPTION OF THE PREFERRED EMBODIMENT

Figure 1:
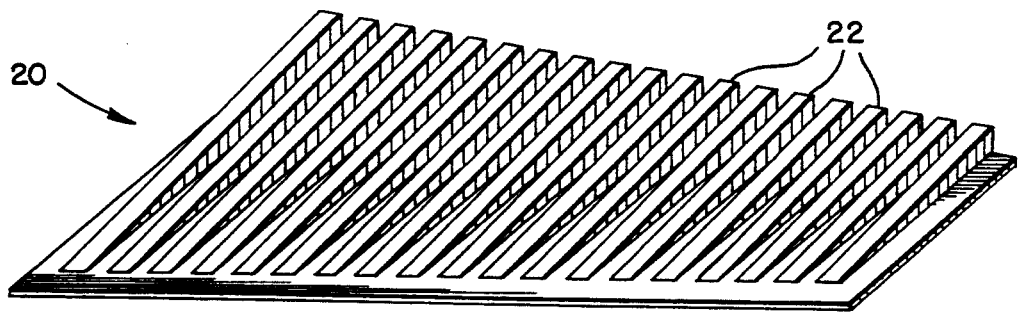
FIG. 1 is a perspective view of a full scale corrugated core for an airfoil fabricated of composite material according to the invention.

Refer now to the drawings and initially to FIG. 1 which is generally illustrative of a corrugated core or substructure 20 of an irregularly shaped item. As illustrated in FIG. 1, the substructure 20 has a plurality of laterally spaced corrugations 22 over which a skin (not shown) can be suitably attached. The resulting structure, in this instance, might be, for example, an airfoil such as horizontal stabilizer for a high performance aircraft. Of course, it will be appreciated that a variety of components of an aircraft structure can be fabricated using the techniques of the present invention and that the invention need not be restricted to airfoil structures. Furthermore, it should be stressed that the techniques disclosed need not, indeed, be restrictive even to aircraft structures but can be utilized in any situation in which it is desired to have a resulting structure which is strong, lightweight, and corrosion-free.

Figure 2:
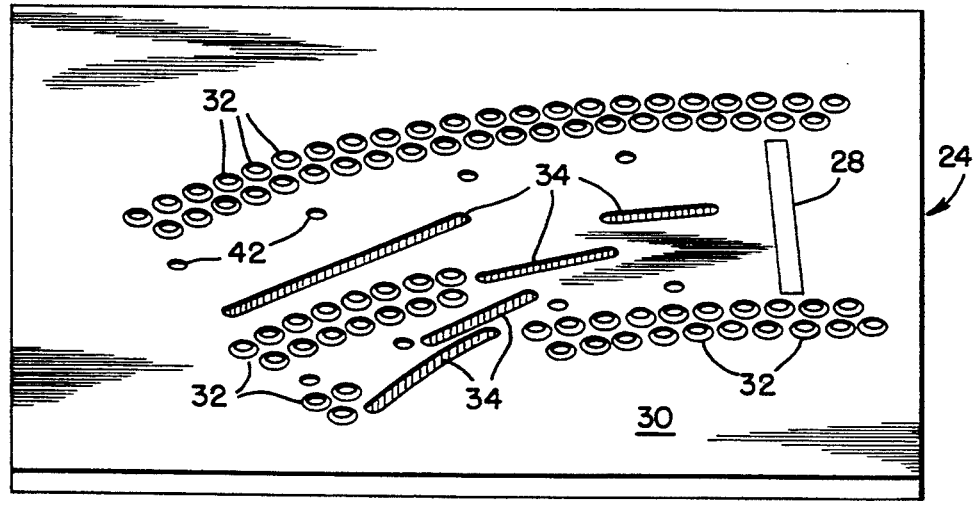
FIG. 2 is a perspective view of an operating surface constructed according to the invention.
Figure 3:
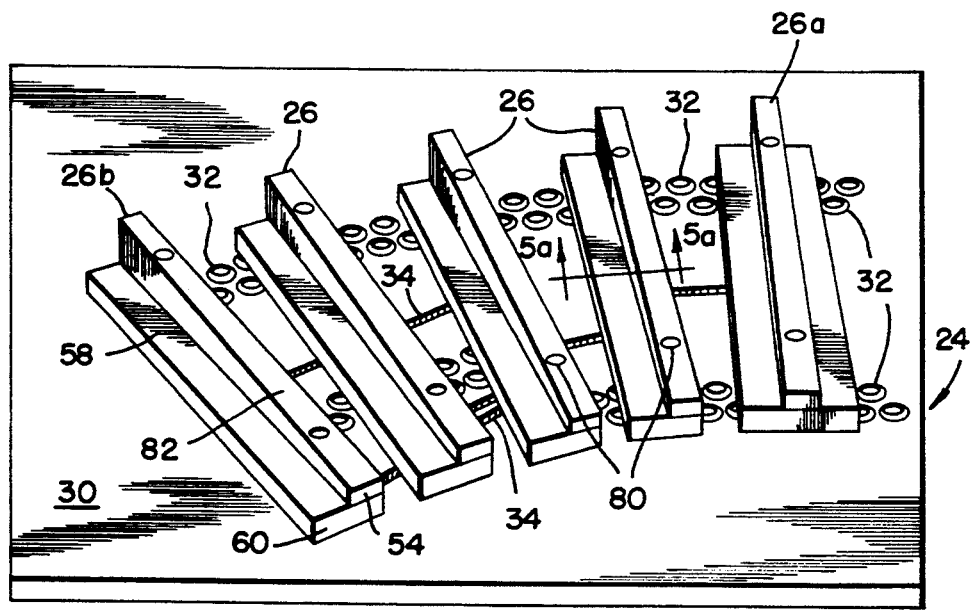
FIG. 3 is a perspective view of a plurality of rib elements positioned on the operating surface of FIG. 2 and assuming an open position.

Turn now to FIGS. 2 and 3 for an initial consideration of kinematic tooling apparatus which is utilized for forming a corrugated substructure such as that indicated at 20 fashioned from composite material. For ease of description, however, the apparatus described will be of a simplified construction and will result in a more simplified end structure than that illustrated in FIG. 1. However, all of the features present in apparatus utilized to form the substructure 20 will generally be present in the apparatus which is about to be described.

As seen in FIGS. 2 and 3, a base plate 24, preferably of steel or other sturdy structural material, is planar and horizontally positioned and adapted to receive thereon a plurality of laterally spaced rib members 26. The base member 24 is formed with a vacuum port 28 which is connected in a suitable fashion to a source of low pressure, high volume vacuum (not shown). In actual fact, the individual rib elements are not seated on an upper surface 30 of the base plate 24, but rather glide on a plurality of nylon buttons 32 of uniform thickness which are suitably mounted, as by adhesive, on the upper surface 30. The buttons 32 are preferably positioned in a number of discontinuous groupings such that the rib members 26 are supported on them at the spaced locations illustrated in FIG. 3 and can move on them between the open positions illustrated in FIGS. 3 and 4 to the closed position illustrated in FIG. 5 without touching the upper surface 30 of the base plate 24.

The buttons 32 serve a dual function. They raise the rib elements 26 above the upper surface 30 to allow free passage of vacuum beneath them for a purpose which will subsequently be described and a substantially reduced surface contact between each rib element and the base plate 24 to minimize friction. In this manner, the rib elements 26 can be moved laterally with minimal force. Of course, buttons 32 of other suitable materials can be utilized and other forms of construction for supporting the rib elements 26 above the upper surface 30 can be envisioned. These can include, for example, continuous or discontinuous strips of nylon or other suitable material positioned on the upper surface 30 having outer or upper surfaces a uniform distance above the upper surface as in the instance of the nylon buttons 32.

The base plate 24 is also formed with a plurality of arcuate shaped discontinuous grooves 34. As seen in FIG. 5A, each of the rib elements 26 includes an integral pin 36 extending downwardly from a lower surface 38 of its associated rib element 26. When each rib element 26 is supported on the base plate 24, resting on the buttons 32, its associated pin 36 is loosely received in one of the associated grooves. In this manner, movement of each rib element relative to the upper surface 30 is constrained in accordance with the limits of its associated groove 34.

Figure 6:
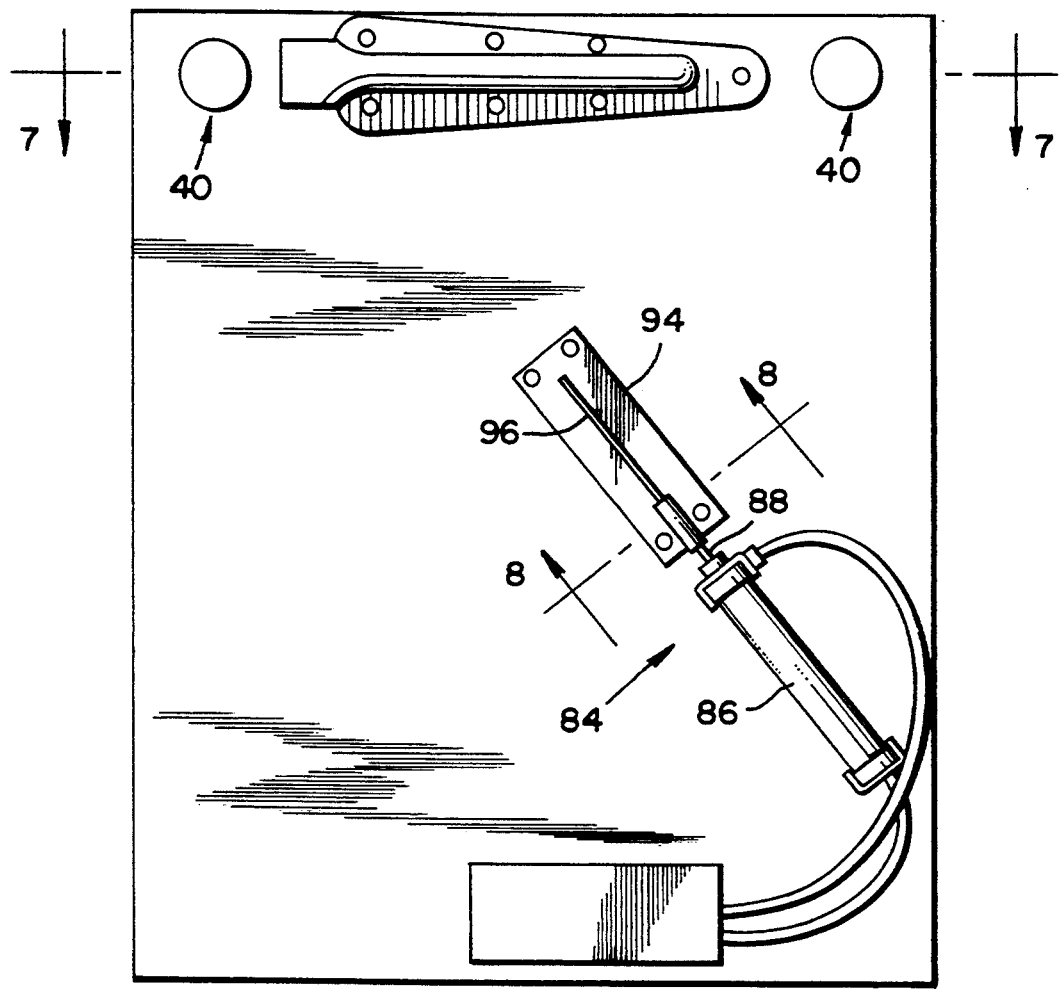
FIG. 6 is a bottom plan view of the operating surface.
Figure 7:
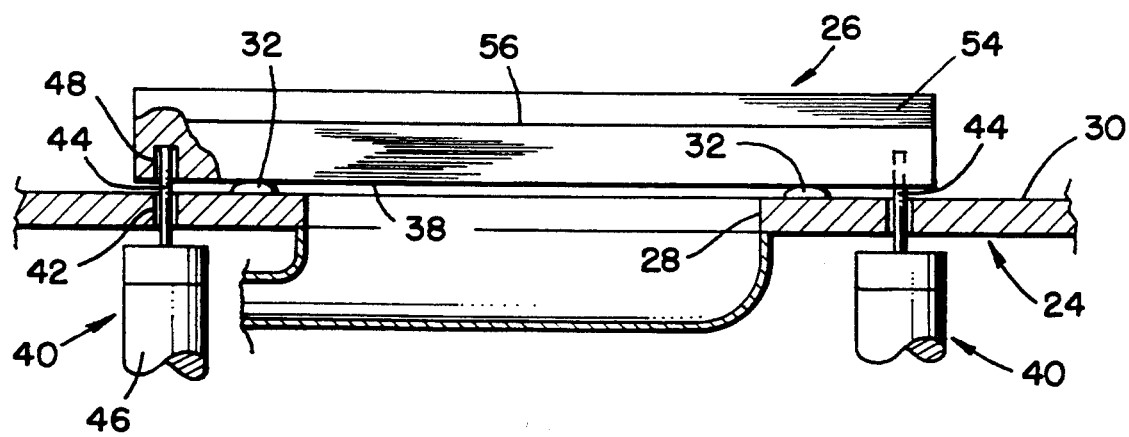
FIG. 7 is a cross section view taken generally along line 7—7 in FIG. 6.

In order to prepare the apparatus for the fabrication operation, the rib elements 26 are positioned in precise locations on the base plate 24 as illustrated in FIG. 3. The positioning of each of the rib elements 26 can be readily achieved by means of an associated pair of retention mechanisms 40 (see FIGS. 6 and 7). To accommodate each pair of retention mechanisms 40, the base plate 24 is provided with a cooperating pair of holes 42 through which a plunger 44 of a piston assembly 46 can be advanced or retracted. When a plunger 44 is advanced, it extends beyond the upper surface 30 of the base plate 24 and is receivable in a bore 48 extending into a rib element 26 through its lower surface 38. When a pair of plungers 44 is engaged with an associated pair of bores 48 of the same rib element 26, the rib element is properly located for the open position. When it comes time to move the rib members laterally, as will subsequently described, the plungers 44 are withdrawn so that their extreme ends are positioned beneath the upper surface 30 of the base plate 24.

When a pair of retention mechanisms 40 has been actuated for each of the rib elements 26, such that they all assume the predetermined open position as illustrated in FIG. 3, a pre-cut piece of prepreg material, preferably graphite cloth and epoxy resin, is then placed over the entire assembly of rib elements. It will be appreciated that the term "prepreg" is commonly used in the reinforced plastics field to mean the reinforcing material containing or combined with a full compliment of resin before molding. At this point, a thin film 52 of suitable air impermeable material [INVENTOR: Kindly specify the composition of the film and its thickness] is placed over the entire assembly whereupon a vacuum in the range of 20 to 22 inches Hg is applied to the plenum formed by the base plate and the thin film 50 via the vacuum port 28. With the application of vacuum beneath the rib elements 26, the prepreg material 50 is drawn downwardly so as to closely conform to outer surfaces of an upper region 54 of the rib elements 26 and including an upper surface 56 (see FIG. 5A) of a longitudinally extending spacer member 58 which is an integral part of a lower region 60 of each rib element. While it has been found preferable in practice for the spacer members 58 to be integral with the upper regions 54 from which they laterally extend, it would be within the purview of the invention for them to be totally separate elements loosely placed upon the upper surface of the buttons 32.

Figure 5:
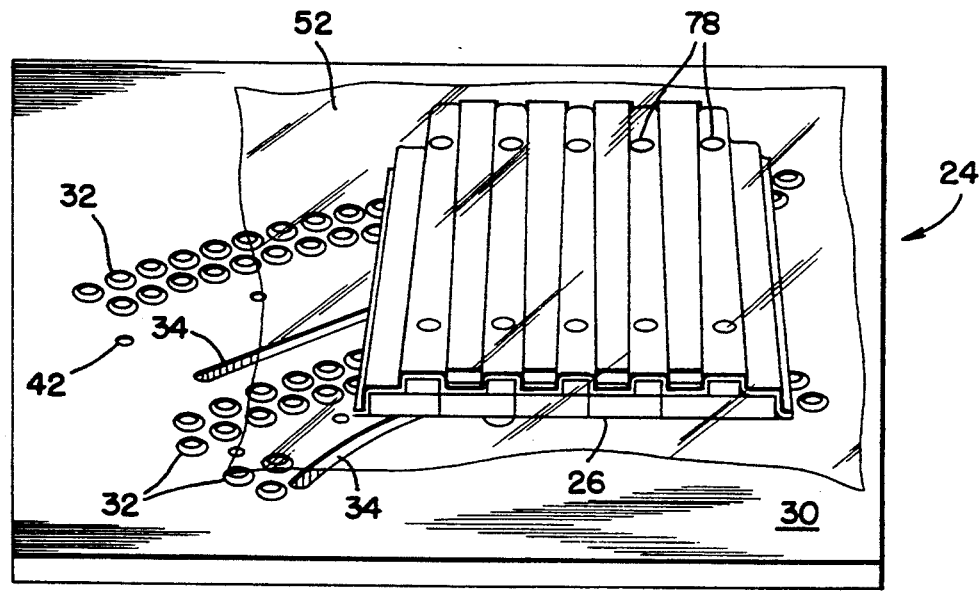
FIG. 5 is a perspective view similar to FIGS. 3 and 4, illustrating the rib elements in a closed position.

The prepreg material 50 is thus drawn downwardly into channels defined by the outer surfaces of adjoining upper regions 54 (FIG. 3) and by each upper surface 56 (FIG. 5A) therebetween. Friction between the prepreg material and the upper regions 54 serves to draw the rib elements toward the closed position, that is, toward the right viewing FIG. 5. In this manner, the free rib elements 26 are moved towards a fixed first rib element 26. As this occurs, the pin 36 and groove 34 arrangement previously described ensures accuracy of the final part by providing a precise track for movement of all rib elements 26 to follow from the fully open position (FIG. 3) to the closed position (FIG. 5).

Additionally, it will be appreciated that the pins 36 and grooves 34 are so relatively positioned that when all of the rib elements 26 are moved to the closed position, adjoining rib elements are substantially mutually coextensive. With continued application of vacuum, the entire assembly closes and forms very accurately and precisely, the desired corrugated substructure. Thereupon, the vacuum is turned off and elongate bar members 62 having substantially the width and depth of the channels between the upper regions 54 of adjoining rib elements 26 are placed in position within the channels (see FIG. 5) and the entire assembly is allowed to de-bulk under continued vacuum. Specifically, once vacuum is applied, the air is forced out between the layers so that the thickness of the debulked part is 90% of the cured part. Although there are other suitable materials out of which the bar members 62 can be fabricated, a preferred material which is particularly desirable for mold making is silicone rubber which is also sometimes known as room temperature vulcanizing or "RTV" rubber.

Finally, a frame fixture 64 fabricated of aluminum or other suitable material is clamped around the entire assembly which allows it to be removed intact from the base plate 24. Debulking at room temperature can be achieved almost immediately. The amount of time to continue debulking is unimportant. The main thing is not to let the part relax for too long a time after vacuum is removed.

As clearly seen in FIG. 9, the frame fixture 64 includes at least a pair of spaced apart laterally extending limbs 66 and at 1 east a pair of spaced apart longitudinally extending ribs 68 with mutual pairs of limbs 66 and 68 joined at their corners. It will be appreciated al though the configuration of the fixture 64 illustrated in FIG. 9 is substantially a square, it could be a relatively unusual shape if such be the case of the assembly of the rib elements 26 with which it is to be employed. In any event, as illustrated in FIG. 9, the laterally extending limbs 66 are engaged respectively with the opposed ends of all of the rib elements 26 and the longitudinally extending limbs 68 are engageable, respectively, with an associated one of the outwardly directed sidewalls of the first and last rib elements 26a and 26b, respectively.

As illustrated in FIG. 10, each of the laterally extending limbs 66 may be formed with a plurality of longitudinally extending fastener receiving bores 70 aligned with similar tapped bores in each of the rib elements 26 for threadedly receiving a bolt 72. When the frame fixture 64 is thus positioned to encompass the closed assembly of rib elements and the bolts 72 fully tightened, it will be appreciated that the entire assembly assumes a rigid condition and can be readily moved from the base plate 24 without adversely affecting the configuration which has been recently imparted to the prepreg material 50.

An alternative arrangement can be provided for clamping the frame fixture to the closed assembly of rib elements 26. Also illustrated in FIG. 11, long bolts 74 can be received through aligned bores (not illustrated) formed in each of longitudinally extending limbs 68 and in each of the rib elements 26. With nuts 76 properly tightened, the entire assembly of the frame fixture 64 and rib elements in their closed positions is sufficiently secured to enable movement of the assembly from the base plate 24 without harm in any fashion to the prepreg material 50 in its corrugated form.

A primary purpose of the frame fixture 64 is to enable removal of the entire assembly for the subsequent curing operation. It may either be autoclave cured or press cured with appropriate fixtures according to known procedures and utilizing known apparatus.

The frictional interaction alone between the prepreg material 50 and the rib elements 26 can be effective to move the rib elements to the closed positions when the rib elements are small and of light weight. However, it has been found desirable to index the prepreg material to heavier and larger rib elements to assure their proper and accurate closure. According to a suitable indexing mechanism which has been utilized, a pair of fasteners 78 extend through openings in the prepreg material and are engageable with holes 80 (FIG. 3) suitably bored in a top side 82 of each rib element 26 at spaced apart locations. In this manner, there is a positive connection between the prepreg material and each of the rib elements and slippage of the prepreg material across the top sides 82 of the rib elements is prevented from occurring as the assembly is moved to its closed position.

Even with the use of the indexing mechanism just described, vacuum alone is suitable to bring the tool together only when the rib elements 26 are small and light in weight. For larger tools, vacuum alone will not achieve closure of the tool element and still assure the required accuracy of the finished article. At the same time, vacuum is still considered to be a desirable component of the manufacturing process. Even if vacuum is not required to close the tool, it does aid significantly in pulling the prepreg material 50 into the channels between the upper regions 54 to assume the precise shape required as the tool closes, and at the same time eliminating any tendency to wrinkle.

Nonetheless, it is possible to achieve a high degree of success even in the absence of vacuum by utilizing a ram mechanism 84 (FIG. 6) which serves to positively advance the rib elements 26 toward the closed position while being aided by the bar members 62 in the process. Viewing FIGS. 6 and 8, the ram mechanism 84 is seen to include an actuator 86 which is preferably pneumatic but may be of any suitable type. Mounted to the bottom of the base plate 24 (see FIGS. 6 and 8), the actuator 86 reciprocably moves a rod 88 to an extreme end of which is mounted an upwardly extending connector pin 90. In turn, the connector pin 90 extends through a slot 92 in the base plate and generally transversely of the rib elements as they are positioned on the upper side of the base plate. The connector pin 90 is slidingly received in a suitable bore (FIG. 8) provided in the underside of the last rib element 26b. A seal member 94 serves to restrict the flow of ambient air from beneath of the base plate through the slot 92 and consists of a sheet of pliable plastic or other suitable material mounted to the underside of the base plate 24 and formed with a slit 96 enabling reception therethrough of the connector pin 90.

Upon operation of the actuator 86, the rod 88 is advanced so as to move the last rib element 26b in a direction of the first rib element 20a and, in succeeding fashion, each of the intermediate rib elements 26. At such time that the rod 88 is substantially fully extended, the entire rib assembly assumes the closed position as illustrated in FIG. 5.

Figure 4:
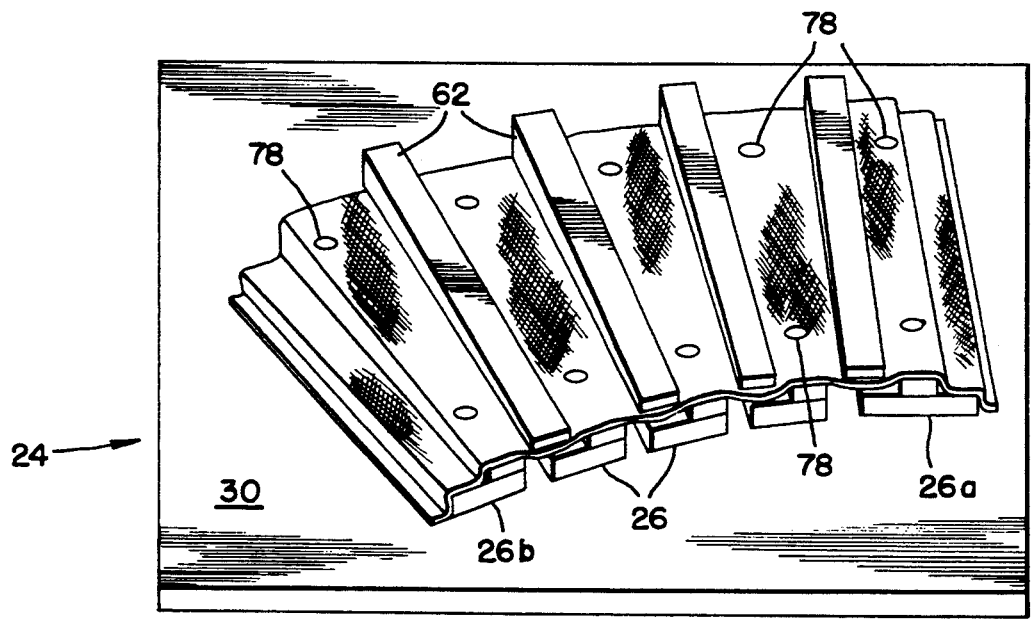
FIG. 4 is a perspective view, similar to FIG. 3, illustrating an intermediate step in the process of the invention.

As in the previous embodiment, a pre-cut sheet of prepreg material 50 is placed over the assembly of rib elements 26 in their open position as illustrated in FIG. 4. Index fasteners 78 are then applied to join the prepreg material to the top sides 82 of the rib elements 26, following which the bar members 62 are placed on the upper surface of the prepreg material 50 so as to overly the upper surfaces 56. As the drive mechanism 84 causes the assembly to move to the closed position, the bar members 62 force the prepreg material into the channels between the upper regions 54 of adjoining bar elements and into a contiguous relationship therewith. Although it is possible to operate the apparatus without vacuum, utilizing the ram mechanism 84 to move the rib elements 26 to the closed positions as the bar members 62 operate to force the prepreg material 50 into a conforming relationship with the rib elements 26, it is nevertheless preferred to simultaneously apply vacuum via the port 28.

In this latter embodiment, as with the former, the frame fixture 64 is utilized to surround the closed assembly of rib elements 26, then properly clamped, to permit removal of the assembly for curing.

It is noteworthy that removal of the entire assembly of rib elements 26, bar members 62 and formed prepreg material 50 results in additional benefits over and above what has already been noted. Specifically, the bulk and weight of the base plate itself need not be subjected to the curing cycle. This also means that vacuum lines, low friction buttons, and other parts which would be destroyed or harmed in a curing cycle can be employed on the base plate proper and used indefinitely. Finally, it means that the base plate 24 can be utilized to receive a new assembly of rib elements 26 while the first assembly is proceeding through the curing cycle.

From the foregoing, it will be apparent that new and improved kinematic tooling apparatus suitable for forming a corrugated substructure from composite materials and an associated new and improved process therefor have been devised. It should be understood, of course, that the embodiments disclosed are merely illustrative and are not intended to limit the scope of the invention. Reference should be made to the appended claims therefore, rather than to the specification as indicating the scope of the invention.

I claim:

1. Kinematic tooling apparatus for forming a corrugated substructure fashioned from composite materials comprising:

a base plate having a substantially planar primary surface and at least one secondary surface extending beyond said primary surface;

a plurality of movable elongated rib elements positioned on said base plate in a predetermined side by side relationship beginning with a first rib element and continuing to a last rib element, each of said rib elements including a lower region defining a longitudinally extending space member and a bottom surface resting upon said secondary surface such that a space is formed between said primary surface and said bottom surface, each of said rib elements including an upper region having outer surfaces which are adapted to receive thereon a pre-cut sheet of composite prepreg material which is generally coextensive with said rib elements;

said rib elements being laterally movable between open, mutually spaced apart positions and closed, mutually adjoining positions whereat said spacer member of one of said rib elements is engaged with an adjacent one of said rib elements, said outer surfaces of an adjoining pair of said rib elements defining a longitudinally extending channel;

a plurality of elongated bar members adapted for reception on a surface of the sheet material which faces away from said rib elements, successive ones of said bar members respectively aligned with successive channels;

retention means for holding at least said last rib element stationary relative to said base plate; and operative means for moving said first rib element in a lateral direction toward said last rib element until all of said rib elements are in the closed position;

each of said bar members being drawn by reason of its weight into an associated one of the channels, thereby forcing the sheet material into a contiguous relationship with said outer surfaces as said rib elements are moved collectively to the closed position;

whereby said rib elements collectively serve as a mold to define the shape of a substructure to be formed out of the sheet material.

2. Apparatus as set forth in claim 1 wherein said retention means is operable for releasably holding each of said rib elements stationary relative to said base plate when said rib elements collectively assume the open position.

3. Apparatus as set forth in claim 1 wherein said retention means are operable for releasably holding each of said rib elements stationary relative to said base plate and includes:

each of said rib members having a pair of spaced apart bores extending through said bottom surface;

said base plate having a plurality of holes therethrough, each hole communicating with an associated bore in one of said rib elements when said rib elements are in the open position; and a piston assembly mounted on said base plate and associated with each of the holes therein including a plunger selectively movable between a retracted position withdrawn beneath said primary surface and an advanced position extending through its associated hole in said base plate and above a plane of said secondary surface into its associated bore in one of said rib elements when said rib element is positioned on said base plate in the open position.

4. Apparatus as set forth in claim 3 wherein said piston assembly includes a actuator for moving each of said plungers between the retracted position and the advanced position.

5. Apparatus as set forth in claim 1 wherein:

said base plate has a plurality of laterally extending slots therethrough underlying said rib elements when said rib elements assume the open position on said base plate; and wherein each of said rib elements includes a pin fixed to the underside of each of said ribs and extending transversely through an associated one of the slots, each of said pins being freely movable lengthwise of its associated slot; and including:

a ram mechanism including at least one axially movable rod pivotally mounted to said pin fixed to said first rib element, said ram mechanism operable for moving at least said first rib element toward said last rib element and continuing until al 1 of said rib elements collectively assume the closed position.

6. Apparatus as set forth in claim 1 wherein:

each of said rib elements has a top side and including:

indexing means releasably fixing the sheet material to said top side of each of said rib elements when said rib elements assume the open position.

7. Apparatus as set forth in claim 6 wherein said indexing means associated with each of said rib elements includes a pair of fasteners extending through openings formed in the material and engagable with said rib element at spaced apart locations thereon.

8. Apparatus as set forth in claim 1 wherein each of said rib elements includes opposed ends with first fastener receiving bores therein and wherein said first and last rib elements include outwardly directed sidewalls, said apparatus including a frame fixture coplanar with all of said rib elements and engageable with said rib elements around their combined perimeter when said rib elements assume the closed position, said frame fixture including at least a pair of spaced apart, laterally extending limbs engageable respectively with said opposed ends of all of said rib elements, said frame structure including at least a pair of spaced apart, longitudinally extending limbs engageable, respectively, with an associated one of said outwardly directed sidewalls, intersecting ends of said laterally extending limbs and said longitudinally extending ribs being joined, said laterally extending limbs having second fastener receiving bores which are coextensive with the first fastener receiving bores in said ends of said rib elements; fastener means extending through the first and second fastener receiving bores to releasably fix said frame structure to all of said rib elements when said rib elements assume the closed position.

9. Apparatus as set forth in claim 1 wherein each of said bar members has a width substantially equivalent to the width of the channel between said upper regions of adjacent ones of said rib elements when said rib elements collectively assume the closed position and a thickness substantially equivalent to the depth of the channel allowing in each instance for the thickness of the sheet material.

10. Kinematic tooling apparatus for forming a corrugated substructure fashioned from composite materials comprising:

a base plate having a substantially planar primary surface with a vacuum port extending therethrough and at least one secondary surface extending beyond said primary surface;

a plurality of movable elongated rib elements positioned on said base plate in a predetermined side by side relationship, each of said rib elements including a lower region defining a longitudinally extending spacer member and a bottom surface resting upon said secondary surface such that a space is formed between said primary surface and said bottom surface, each of said rib elements including an upper region having outer surfaces which are adapted to receive thereon a pre-cut sheet of composite prepreg material which is generally coextensive with said rib elements;

said rib elements being laterally movable between collectively open, mutually spaced apart positions and collectively closed, mutually adjoining positions whereat said spacer member of one of said rib elements is engaged with an adjacent one of said rib elements, said outer surfaces of an adjoining pair of said rib elements defining a longitudinally extending channel;

a plurality of elongated bar members adapted for reception on a surface of the sheet material which faces away from said rib elements, successive ones of said bar members respectively aligned with successive cavities;

a removable cover member engageable with said primary surface and overlying the combination of said rib elements and said bar members and the sheet material to define a plenum therein isolated from the atmosphere;

a source of vacuum communicating with the plenum via the aperture in said base plate operable to draw the sheet material into the channel, and by reason of the friction between the sheet material and said outer surfaces, to draw all of said rib elements into said closed positions, each of said bar members being drawn by reason of its weight into an associated one of the channels, thereby assisting the vacuum to draw the sheet material into a contiguous relationship with said outer surfaces whereby said rib elements collectively serve as a mold to define the shape of a substructure to be formed out of the sheet material.

11. A kinematic process for forming a corrugated substructure fashioned from composite materials comprising the steps of:

placing a plurality of moveable elongated rib elements on a base plate in a predetermined side by side spaced relation ship;

overlaying outermost surfaces of the rib elements with a pre-cut sheet of composite prepreg material;

releasably fixing the sheet material to the outermost surfaces of the rib elements;

moving the rib elements laterally to collectively closed positions at which upper regions thereof remain spaced apart to form channels;

drawing the sheet material into contiguous relationship with the outer surfaces of the rib elements including the channels when the rib elements collectively assume the closed position;

thereby defining the shape of a substructure to be formed out of the sheet material.

12. a kinematic process as set forth in claim 11 including the steps of:

holding the rib elements collectively in the closed position; and curing the sheet material while the rib elements are held in the closed position.

13. A kinematic process as set forth in claim 11 wherein the step of laterally moving the rib elements includes the step of mechanically moving the rib elements.

14. A kinematic process as set forth in claim 11 wherein the steps of laterally moving the rib elements and drawing the sheet material into contiguous relationship with the rib elements include the steps of:
- isolating the combination of the rib elements and the sheet material thereon from the surrounding atmosphere to thereby define a plenum; and
- evacuating the plenum from a location beneath the rib elements thereby simultaneously drawing the sheet material into contiguous relationship with the rib elements and, thereby in turn moving the rib elements to their collective closed position.

15. A kinematic process as set forth in claim 14 wherein the step of laterally moving the rib elements includes the step of mechanically moving the rib elements.

* * * * *